United States Patent [19]

Vollmerhausen

[11] Patent Number: 4,917,329
[45] Date of Patent: Apr. 17, 1990

[54] AERIAL AIRCRAFT CARRIER

[76] Inventor: Robert H. Vollmerhausen, 1809 Anderson Rd., Falls Church, Va. 22043

[21] Appl. No.: 204,264

[22] Filed: Jun. 9, 1988

Related U.S. Application Data

[63] Continuation-in-part of Ser. No. 59,602, Jun. 8, 1987.

[51] Int. Cl.$^4$ .................. B64D 5/00; C64C 39/08; C64C 37/02
[52] U.S. Cl. .................................................. 244/2
[58] Field of Search ........................................ 244/2, 3

[56] References Cited

U.S. PATENT DOCUMENTS

| | | | |
|---|---|---|---|
| 2,364,803 | 12/1944 | Mayhew | 244/2 |
| 2,471,599 | 5/1949 | Young | 244/2 |
| 3,003,717 | 10/1961 | Booker | 244/2 |

FOREIGN PATENT DOCUMENTS 407408  10/1944  Italy ........................................ 244/2

Primary Examiner—Joseph F. Peters, Jr.
Assistant Examiner—Rodney Corl

[57] ABSTRACT

An aerial aircraft carrier is disclosed having a first and a second shuttlecraft that have a cantilever fluselage extending between the first and second shuttlecraft. The cantilever fuselage is disposed at both ends within a fuselage housing that depends from the under-carriage of the first (lead) and second (aft) shuttlecraft, the cantilever fuselage forming a longitudinal member therebetween. A means for elevating a plurality of aerodynamically stable platforms, (wing assemblies), is affixed to the cantilever fuselage. The wing assemblies each have a wing span member attached thereto, with control surfaces, for stabilizing an aircraft (a payload) that is secured in a mount assembly. An aircraft landing in the mount assembly is secured by an application of negative air pressure against a landing gear pod of the aircraft, and as the aircraft is adhered to a pair of mount elements, by evacuation of air, forming a suction seal peripheral to the environmental surfaces of the landing pod, the wing span members aerodynamically stabilize the weight of the aircraft on the wing assembly platforms. The pilot of the retrieved aircraft then feathers the rotors to his/her aircraft, the weight thereof being primarily supported by the aerodynamic lift of the wing span members. The aircraft is then retrieved in flight, aerodynamically stabilized and can be serviced while in flight. A reverse sequence allows the secured aircraft to be launched from the carrier apparatus.

6 Claims, 4 Drawing Sheets

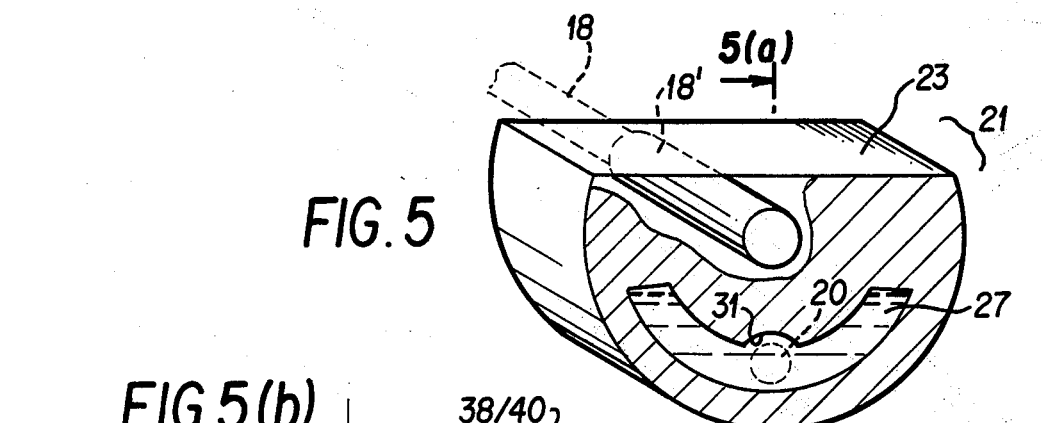
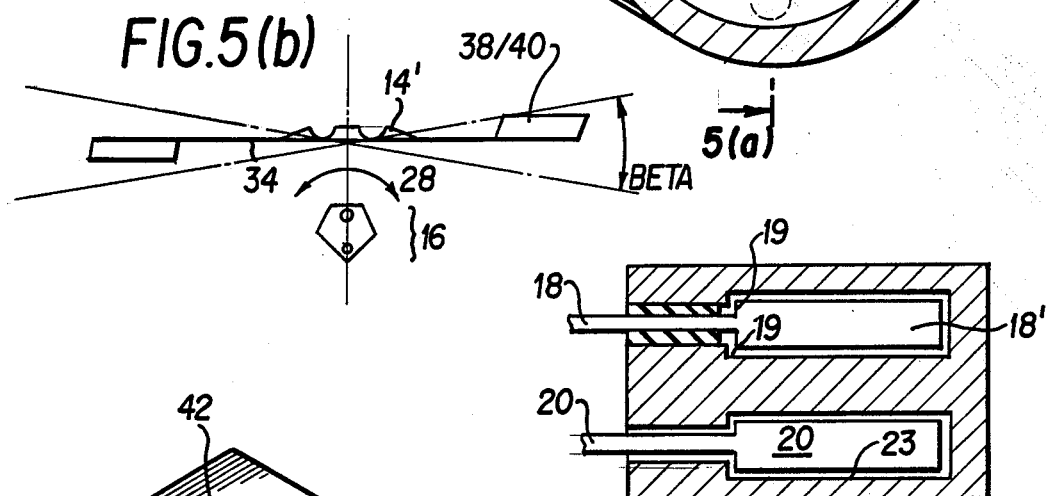
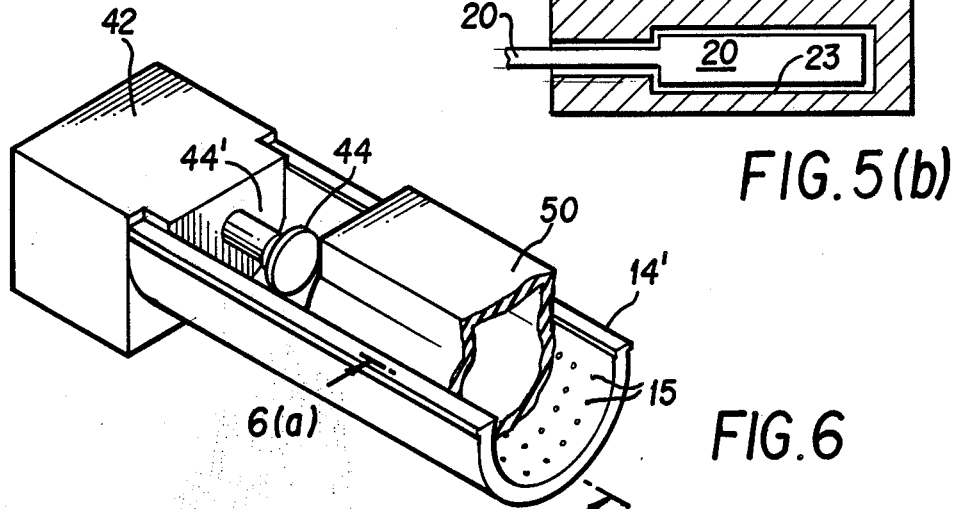
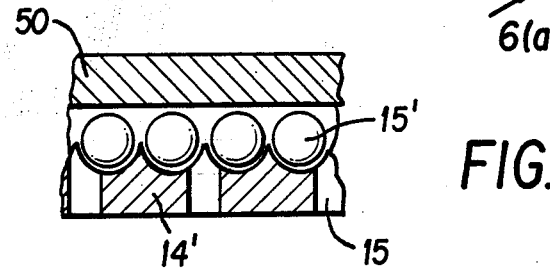

AERIAL AIRCRAFT CARRIER

REFERENCE TO RELATED APPLICATIONS

This application is a continuation-in-part of application Ser. No. 059,602, filed June 8, 1989.

FIELD OF INVENTION

The present invention is directed to an apparatus for the in-flight retrieval, servicing, and launching of aircraft from a carrier aircraft. Specifically, the invention discloses an aircraft on which secondary aircraft land, are serviced in flight, and are re-launched.

The instant invention further teaches the construction of an aerial carrier for the long-distance moving of heavy machinery and other items too large or heavy for conventional air transport.

BACKGROUND TO THE INVENTION

A long felt need has existed for means to extend the range and armament capability of rotary wing and other military aircraft. All aircraft design makes compromise between fuel (range) and useful payload (armament).

One of the most versatile tactical aircraft is the helicopter that is well suited to both day and night operations due to it's unique ability to hover. Hovering, or moving slowly close to the terrain, Nape of the Earth flight, is however, costly in terms of fuel used. Therefore, for rotary wing aircraft, fully armed, to have sufficient mission time the provision for land based or ship-based logistic and servicing areas, within easy flight distance, is absolutely necessary.

The provision for land or sea-based fuel and ordance dumps carrys within itself certain costs. It is axiomatic, for example, that a squadron of helicopters cannot travel much further or much faster than the required logistic support apparatus. It is one thing to ferry a helicopter across the United States, knowing there are airfields with fuel. Quite another when the mission is remote from the shores of the United States and no secure or appropriate facilities exist. Both aircraft and required fuel and ordance travel with the pace of the slowest essential element of the support apparatus.

The present invention discloses an aircraft having means for retrieving both rotary wing and fixed wing aircraft in flight, and means for selectively moving these retrieved aircraft from one mount element to another so as to position the retrieved aircraft over servicing bays from which access to the retrieved aircraft may be secured. The aircraft so positioned for servicing then being refueled and rearmed.

The invention answers a long felt need to extend the logistic support apparatus closer to an area of combat operations, and to provide greater logistic support to the combat forces operating within the zone.

Further, the present invention teaches constructive reduction to practice in the art of dynamically stabilizing such retrieved aircraft on the carrier so as to facilitate the safe, efficient and timely delivery of retrieved aircraft to a destination, or for the fast, unimpeded movement, and launch of missiles that heretofore have been too large for launch by aircraft.

SUMMARY OF THE INVENTION

A primary object of the present invention is to proive a means for the in-flight retrieval, servicing and re-launching of aircraft, both rotary wing and fixed wing types.

Another object of the invention is to provide a means for the in-flight, aerodynamic, stabilizing of such aircraft or freight items as are secured to the carrier apparatus.

Another object of the invention is to provide a plurality of wing assemblies to interact, structurally, with a cantilever-fuseledge so as to dynamically stabilize such loads as are secured by the aerial carrier.

Another object is to provide means for controlling the relative movement of each of a plurality of secured (retrieved) aircraft, by the wing assemblies, so as to keep such movement, along all major axis, but most especially of the roll axis of the carrier aircraft within strict degrees of freedom.

Another object is to provide means for utilizing a cantilever fuseledge, combining the principles of bridge construction with those of aircraft frame design, to provide requisite degrees of torsional and flexional strength and resiliency such that torsional stresses set up in the cantilever fuseledge, by opposite actions along the roll axis by the wing assemblies, is countered by a counter-torsional resiliency of the cantilever fuseledge; the net effect being to rotate both wing assemblies back to a substantially level position.

Another object of the invention is to provide a torsion-reduction means so as to further provide a degree of angular freedom of the cantilever fuseledge about the roll axis of the carrier so as to structurally isolate the fore and aft shuttle craft from the random, and minor flight adjustments made by the wing assemblies as they provide both lift and rotational stability to the load carried thereon.

Another object of the invention is to provide a means for control that is structurally inherent to, and hydraulically activated by, rotational movement of the cantilever fuseledge so as to assist the smooth, unfrettered flight of the carrier.

A further object of the invention is to provide a means for hydraulically dampening random adjustment movements, by the wing assemblies, when these rotational adjustments are sufficiently large to be transmitted along the longitudinal length of the fuseledge. This means for hydraulically dampening wing assembly movements being especially applicable with a pair of such wing assemblies, reacting to identical flight conditions, 'team-up' to impose a uniform clockwise or counter-clockwise torsional stress on the cantilever fuseledge.

A further object being to provide a cantilever fuseledge having a main span and a secondary span, one substantially above the other, and enclosed in a framework (airframe) providing conduit means for essential electrical, mechanical, pneumatic and hydraulic systems and further defining within the fuseledge itself a crawlspace/catwalk permitting pilot and crew access to and from the aircraft secured above.

A further object is to provide means for disingagement of the cantilever fuseledge from the shuttlecraft for the replacement thereof so that such replacement may be more fully suited to the torsional resiliency requirements as are anticipated by the loads to be carried. The aerial aircraft carrier apparatus, then, being modular in concept and in construction.

A still further object is to provide a means for elevating the wing assemblies and a pair of elevational mount elements for the retrieval, alignment and re-launching of aircraft from the carrier.

A further object is to provide means for selectively moving such retrieved aircraft from the elevational (limited movement) mount elements to one of a plurality of stationary mount elements. The displacement of aircraft from one to the other having capacity for movement in either direction, elevational to stationary, and stationary to elevational.

DESCRIPTION OF THE PRIOR ART

| Application No. | Inventor |
| --- | --- |
| 07/059,602 | Vollmerhausen |

This application discloses a shuttle craft and means for adhering cargo pods to a stationary mount craddle member. The cargo pod rides piggyback style within the mount craddle member and adheres to the craddle member through the application of a negative air pressure, a suction seal, between the cargo pod and the craddle member.

DESCRIPTION OF THE DRAWING

FIG. 1 (a) illustrates the lead or first elevational mount element lowered, recessed, onto the cantilever fuseledge member.

FIG. 5 is a perspective view of a fuseledge housing that illustrates the main span and secondary span entering the housing, the secondary span entering a hydraulic reservoir.

FIG. 5 (a) is a cross sectional view taken along lines 5 (a)—5 (a) and illustrating the termulus of both the main span and the secondary span within the fuseledge housing and a flange element securing both the main span and the secondary span within the housing.

FIG. 5 (b) illustrates, by means of a diagram, the relationship between the hydraulic dampening mechanism of the secondary span within the fuseledge housing and the wing assemblies so as to hydraulically dampen wing movements within an angular range of freedom (beta angle).

FIG. 6 is a perspective view illustrating a landing pod of an aircraft disposed within one of the pair of mount elements, and a telescoping hydraulic ram disposed to one end thereof.

FIG. 6 (a) is a cross sectional view taken along lines 6(a)—6(a) of FIG. 6 that illustrates a plurality of negative air orifices disposed within the surface of the mount element and a plurality of roller means disposed within the surface thereof on which the lower surface of the landing pod of the aircraft rests.

DESCRIPTION OF THE PREFERRED EMBODIMENT

Figure 1:
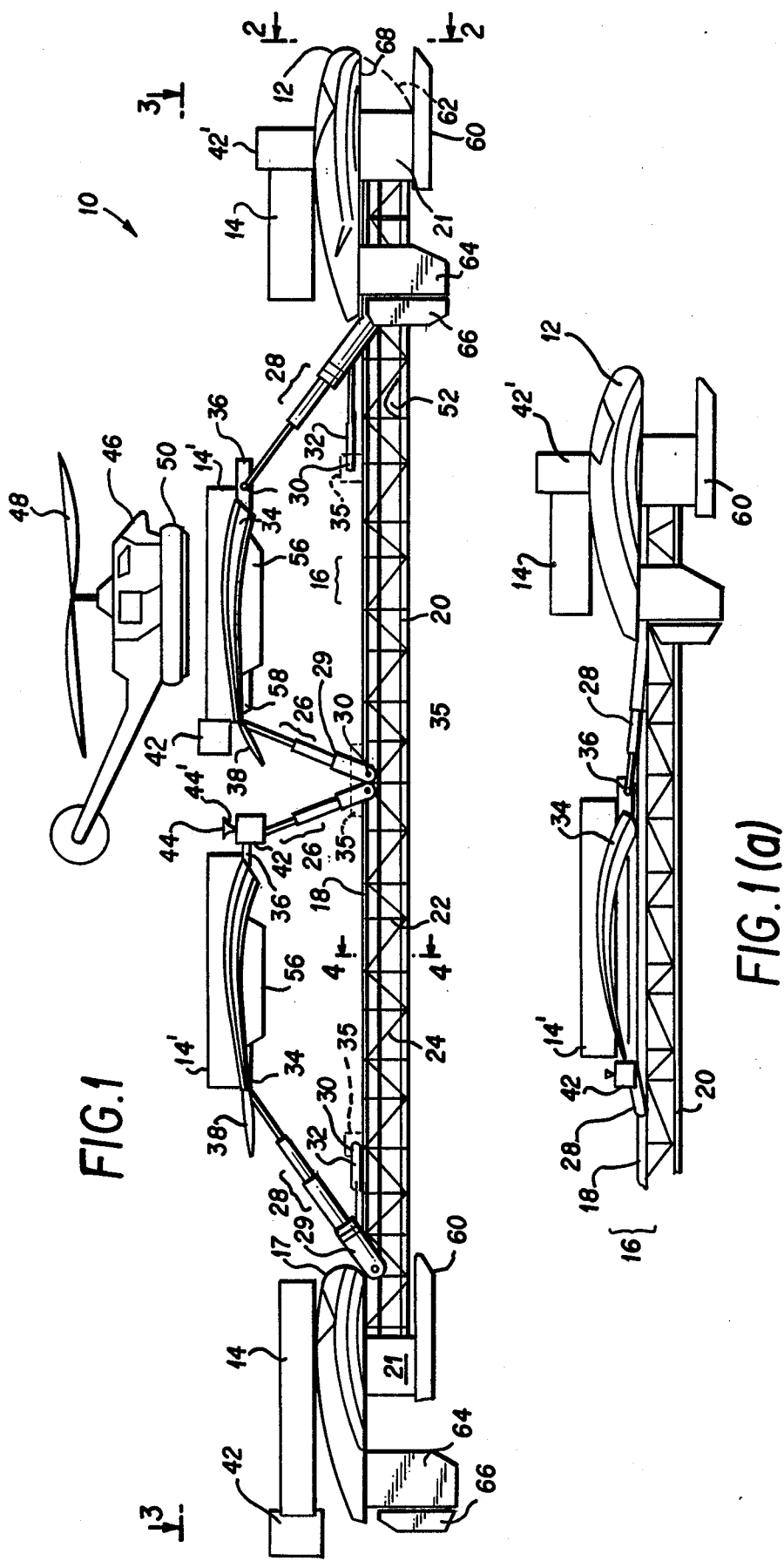
FIG. 1 is an elevational view illustrating a lead or first shuttle craft, a aft or second shuttle craft, a cantilever fuseledge extending therebetween. The cantilever fuseledge has a pair of wing assemblies elevated by hydraulic means, and each one of the wing assemblies has a pair of elevational mount elements. A helicopter is shown landing or departing from the lead or first elevational mount element.

Refering now to the drawing in which like numerals represent like elements throughout, apparatus 10 can be in FIG. 1 and in FIG. 1 (a) to include a first and a second shuttle craft 12, 17 having a cantilever fuseledge longitudinally extent therebetween.

Figure 2:
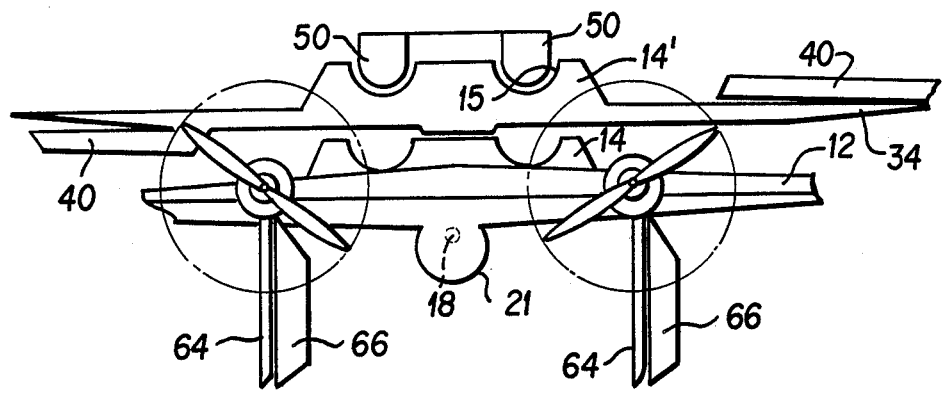
FIG. 2 is a front view that shows the lead shuttlecraft with stationary mount elements affixed to the upper surface thereof and the lead wing assemblies aerodynamically and hydraulically elevated behind the shuttle with a cutaway representation of landing gear elements adhered within the elevational mount elements.

First and second shuttle craft 12, 17 having engines 12' as shown in FIG. 2 (not shown in other figures for clarity) that provide propulsion to the apparatus. The shuttle craft having means for control such as vertical stabilizer 64 and rudder 66; the shuttle being a flying wing that typically have less wind resistance than a conventional aircraft.

The aft or second shuttle utilizes a long, cantilever fuseledge and it's ability to rotate about a center of rotation, as is hereinafter more fully described and claimed, to use 'reverse rudder' and 'reverse' wing action to stay aligned behind the lead or first shuttle. One of the purposes of an essentially 'tubular' fuseledge 16 is to provide a means for wing alignment between the shuttles and a plurality of intermediate members.

Figure 4:
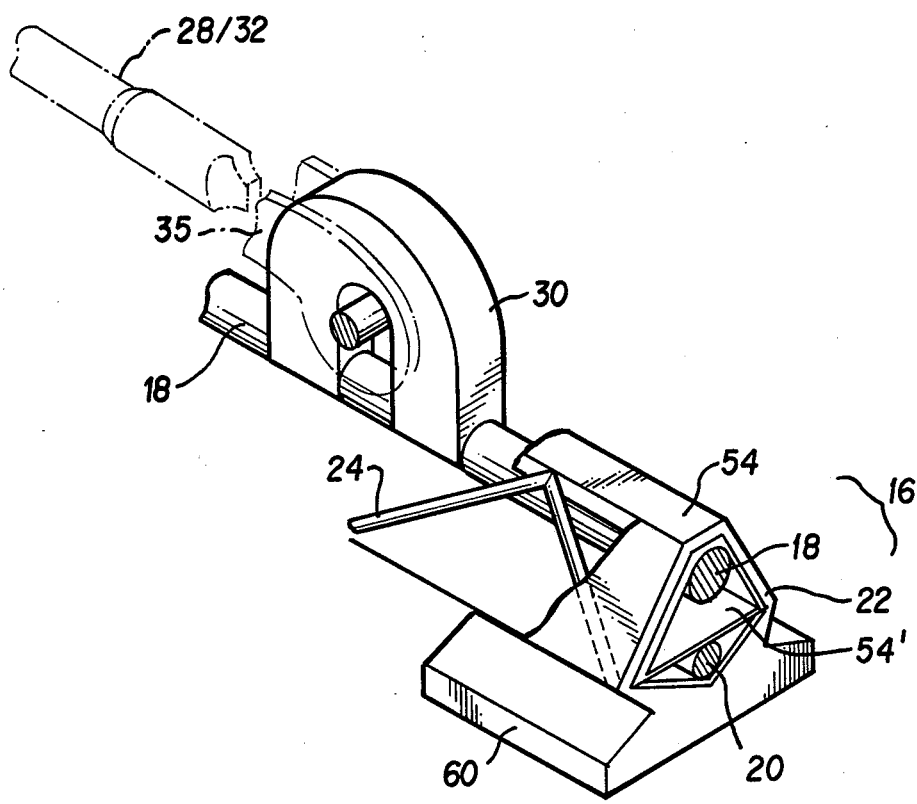
FIG. 4 is a isometric view of a section of the cantilever fuseledge that illustrates the structure thereof and the arrangement of a main longitudinal span disposed substantially over a secondary span, a surrounding network of bracing elements.

Cantilever fuseledge 16, in the preferred embodiment, has a main span member 18 and a secondary span member 20 that are typically enclosed in a network of supporting elements, such as vertical bracing 22 and diagonal bracing 24. The support bracing 22/24 is covered by protective covering material 52, defining within fuseledge 16 crawlspace 54,' as illustrated in FIG. 4 that is used for foot-traffic access throughout the apparatus, as between shuttlecraft and retrieved aircraft supported within mount elements 14' above.

Fuseledge 16 extends between the first (lead) shuttle craft and the second (aft) shuttle craft and provides a conduit for men and equipment therethrough.

Fuseledge 16 also provides a foundation support for a plurality of wing assemblies 34, 34'. Wing assemblies 34, 34' are rigidly affixed to a first assembly element and a second assembly element, 36 and 36' respectively.

Figure 3:
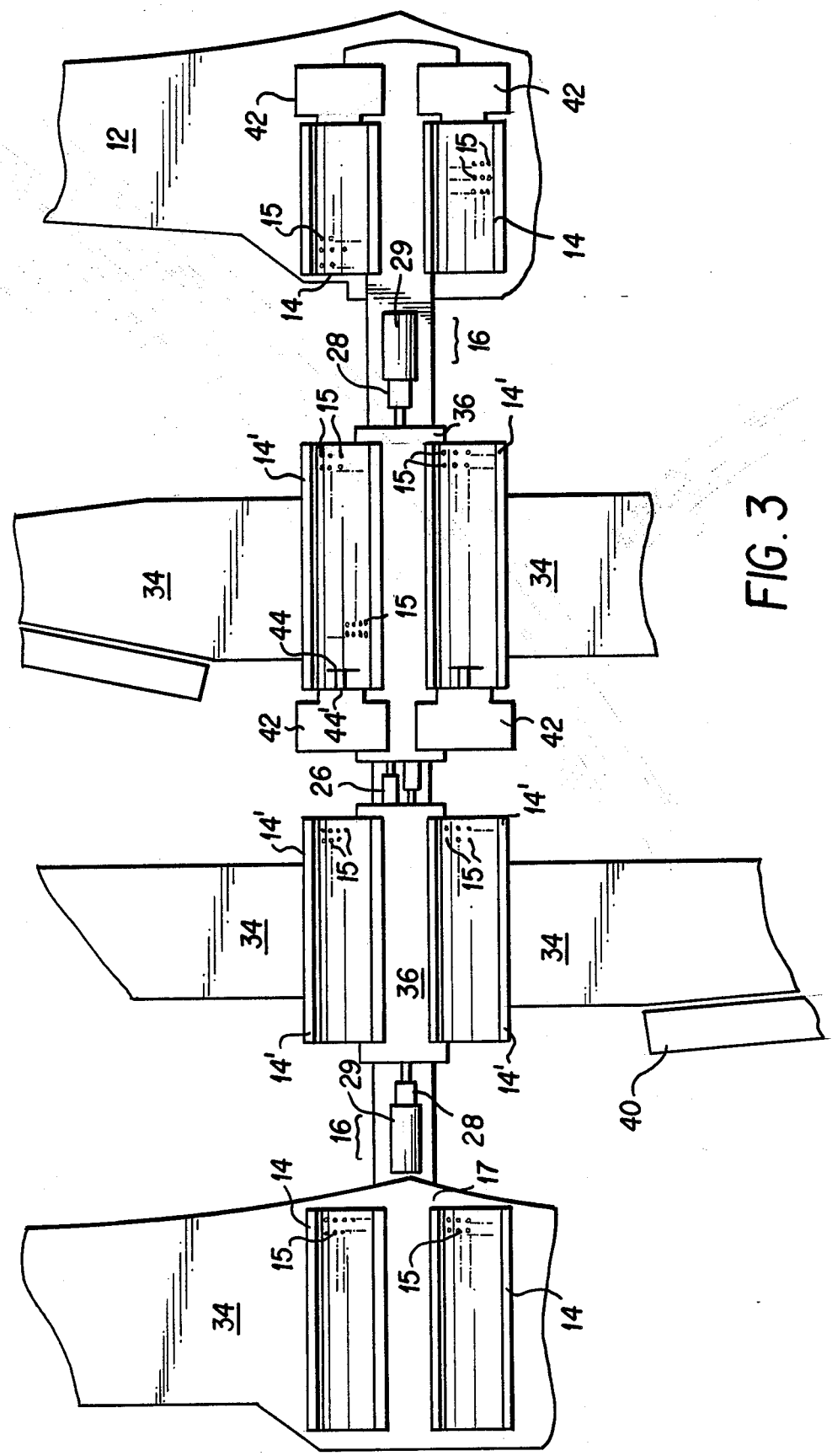
FIG. 3 is a top view of the apparatus that illustrates another perspective of the apparatus, showing a pair arrangement of the stationary and elevational mount elements and the hydraulic actuating means intermediary to the mount elements. Figure three also illustrates both the wing members and the control elements thereon.

Cantilever fuseledge 16 has, within the co-operative arrangement of the elements of the invention, a degree of rotational freedom within which the wing assemblies react to load conditions. The essential purpose, obviously, being to prevent the loads, with the high center of gravity thereof, from rotating over much as a ship on it's beams ends, from capsizing. Each mount assembly has a pair of mount elements as shown in FIG. 3.

Aircraft positioned in mount elements 14, 14' are approximately balanced, statically, about their own longitudinal center of gravity. However, as the carrier turns or maneuvers, the center of gravity shifts (opposing the turn) which requires a wing span of sufficient length to efficiently counter-balance the shift in weight and return the apparatus to a balanced in-flight condition. This process is, of course, on-going in flight.

As wing assemblies 34, 34' react, under aircraft (computer) systems control, actuating control surfaces such as flaps 38 and ailerons 40, first and second assembly elements 36, 36' are rotated in a clockwise or a counterclockwise rotation to maintain an aerodynamically maintained load stability in flight. The lift and stability of the loads is, then, maintained aerodynamically, not mechanically. The mechanical elements of the invention serving only to restrain the wing assemblies, but not to carry or control them. The vertical relationship of the wing assembly(ies) and the lead shuttle craft is illustrated in FIG. 2. FIG. 1(a) shows the lead wing assembly as lowered (retracted) to reduce air resistance.

Wing assemblies 34, 34' are rigidly affixed to first and second assembly elements 36, 36', a rotational action (the vector of lift co-efficient) is transmitted through a means for elevating, such as hydraulic actuators 26, 28, and 32, from the first and second assembly elements to cantilever fuseledge 16.

Hydraulic actuators 28/32 and 26 are pivotably affixed to fuseledge 16 substantially as illustrated in FIGS. 1 and 4. Hydraulic actuators 26, 28, and 32 function to elevate first and second assembly elements 36, 36', the actuators 26, 28, 32 having a degree of angular motion restrained to the elevational angle by sheer plates 35.

Any co-efficient of lift, generated by wing assemblies 34, 34', in a 'not straight and level' flight, biases the first and second assembly elements against hydraulic actuators 26, 28, and 32, and further biases the hydraulic actuators against sheer plates 35 which, in turn, act in a vector of rotational force against fuselege 16, but specifically against main span member 18, causing a torsional movement or stress about the main span member centerline.

Hydraulic actuator pivot mounts 30 are rigidly affixed to main span member 18 so as to pivot about the centerline of the main span member. All hydraulic actuators are affixed to main span member 18; fuseledge 16 thereby pivoting, rotationally, about a longitudinal centerline extending through the main span member.

Main span member 18 is constructed of any suitable material, such as high strength carbon epoxy materials exhibiting high strength to weight ratios and further exhibiting high resistance to materials fatique. Main span member 18 is a 'backbone' from which hangs secondary span 20 and on which is supported wing assemblies 34, 34'.

As wing assemblies 34, 34' act opposingly, along the roll axis of the aircraft an opposing torsional stress is set up within main span 18. One component or vector of force is clockwise and the other counter-clockwise. The long, relatively thin design of the main span member, the cantilever, exhibits a torsional resiliency, as determined by the co-efficients of elasticity and resiliency determined by the exact materials used in construction and the length and diameter of the span member itself. This resiliency or 'unwinding' functions of force wing assemblies 34, 34' back to a substantially level flying position. Mechanically, the main span member acts as a point of rigidity, resisting the torsional action of the wing assemblies.

This torsional resiliency resists any but the most minor concurrent rotational clockwise and counter-clockwise movement imposed on the aircraft as by one of the wing assemblies 'yawing' left while the other, concurrently 'yaws' to the right. The first, essential purpose of the cantilever main span member is, then, to 'force' first and second assembly elements into an elevational alignment, the main span member being the 'spring' used for that function.

The elevational means, in the preferred embodiment being telescoping hydraulic actuators, acting in this function of stress transmittal, as rigid elements bond at both ends so as to pivot only through an elevational range of angles.

As the wing assemblies 34, 34' transmit any rotational movement to the cantilever fuseledge, this transmittal of movement occurs through all elevational angles of the wing assemblies above the fuseledge; that is, all 'roll' movement of the wing assemblies is constrained by and transmitted to the main span member 18 of cantilever fuseledge 16.

The advantage of this arrangement of the elements of apparatus 10 is in the control of the aircraft. If all roll movement of the wing assemblies were not constrained to pivot through a longitudinal centerline of main span member 18, then more than one roll axis would result; that is, the roll axis(s) would elevate with the elevation of the wing assemblies with a resulting creation of multiple aircraft axis.

In the preferred embodiment, apparatus 10 mechanically constrains all such roll movements to fuseledge 16, and fuseledge 16 is mechanically constrained to vector force(s) to main span 18, any roll movement of the wing assemby(ies) then finds its center of rotation through a longitudinal centerline of main span 18. And, as fuseledge 16 is mechanically rigid with respect to the roll axis of the aircraft 10, any roll movement occuring upwardly on the elevating means, above main span member 18, has a smaller, but angularly equal off-setting displacement in member 20 that is disposed below main span member 18.

Supporting network 22/24 defines a structural relationship between main span member 18 and secondary span member 20. Main span member 18 is disposed substantially vertically over secondary span 20 such that as span member 18 is rotated, as by a torsional stress placed tangentially thereon, secondary span 20 is swung through an arc having as its point of rotation the centerline of span member 18.

This mechanical relationship is diagramatically shown in FIG. 5 (a). As both wing assemblies 34, 34' react to flight conditions by lowering a left or right wing (in unison) the aerodynamic co-efficients of lift on the wing surfaces would, if left unchecked, function to force the aircraft in a turn or veering maneuver.

FIG. 5 illustrates that the centerline of main span member 18 determines an arc of travel of a centerline of secondary span member 20 within fuseledge housing 21.

Fuseledge housing 21 has an upper surface 23 affixed to the undercarriage 68/70 of each of the shuttlecraft 12, 17 by any suitable fastening means, such as rivets or threaded fasteners (not shown).

As main span member 18 enters fuseledge housing 21 it expands diameterically at flange element 19. Termulus member 18', an extension of main span 18, is seated within housing 21, and is biased against flange element 19 by flange surface 19'.

Secondary span member 20 expands diameterically at secondary flange element 23' forming bulbous termulus element 20' that is seated within fuseledge housing 21. As termulus element 18' rotates about its centerline, termulus element 20' is swung through an arc as illustrated in FIG. 5.

Fuseledge housing 21 has slotted apperture 27, the angular limits being defined by surfaces 27 and 27", the apex of the angle (alpha) being at the centerline of main span 18'. The limits of angle (alpha) coinsiding with the limits to an angle (beta), as illustrated in FIG. 5 (a) that wing assembly wingspans make as the wing tips move up or down, thereby making a movement along the roll axis, and about the same main span member centerline.

Beta angle is software driven and is loaded into the aircraft control system, the angle being determined by calculation of the antincipated weights (loading) and the flying conditions expected. The harsher the flying conditions, the smaller the beta angle allowed.

The wing assemblies, under aircraft computer control, stabilize weights carried in mount elements 14, 14'. Stabilization is achieved through the selective actuation of control surface, flaps 38 and ailerons 40. Wing assemblies 34, 34' then provide co-efficients of lift and a degree of rotational stability through the beta angle as determined by the aircraft control system and the determination of the alpha angle in fuseledge housing 21 as illustrated om FIG. 5(b).

As a rotation of fuseledge 16 causes secondary span member 20/20' to swing through slotted apperture 27, it biases clockwise or counterclockwise against surface 27', or 27''. As the force for rotation moves wing assemblies 34, 34' out of allowable range of angular limits (the beta angle) fuseledge housing 21 is rotated upward, with the centerline of main span member 18 as a pivot point, to biase against shuttle craft 12, 17; the force of rotatation then being distributed to the lead and aft shuttle carft. The pilot and the control system then apply counter-force through the shuttlecraft's control surfaces to effect a return of wing asesmblies 34, 34' to within the beta angle.

As secondary span member 20/20' swings through angle alpha, its motion is resisted by hydraulic fluid that fills resevoir 27; the motion of secondary span member 20/20' forcing hydrualic fluid through passage 31 to thereby dampen the rotational movements of wing assemblies 34, 34'.

In maneuvering, apparatus 10 uses a control system to selectively actuate control surfaces 38, 40 on wing assemblies 34, 34', however, as with a sea-going ship heeling hard into the wind, the further the beta angle, in this example, is exceeded, the slower will be the recovery from the turn. Apparatus 10 has, however, the design capability of revolving a secured payload in mount elements 14, 14' completely through a 360 revolution provided that the wing assemblies, in conjuction with the power of the shuttle engines, have a coefficient of lift sufficient to effect the recovery.

Wing assemblies 34, 34' can be designed to be aerodynamically effective in any attitude of flight, right side up or down and as such can be utilized for the long range transport of missiles or other payloads such as would normally be carried or deployed from a 'bomb-bay' position; the function and design of fuseledge 16 allowing payloads to be carried above or below the aerial carrier 10.

Retractable landing gear (not shown) is enclosed in cowling 60 by which the apparatus 10 effects takesoffs and landing, but also by which the loads, as may be affixed to the apparatus at takeoff, are balanced until wing assemblies 34, 34' have sufficient airflow to achieve the necessary co-efficients of lift to effect a stablization.

In operation, an incoming aircraft 46, with rotory wing 48, and landing pod 50 maintains a straight, level flight while carrier 10 maneuvers under same. As hydraulic actuators are deployed, elevating wing assemblies, the actuators are selectively positioned (raised) to within proximity of landing pod 50.

The structure of mount elements 14, 14' are illustrated in FIGS. 6 and 6 (a) and show mount element 14, 14' to have a substantially circular cross-sectional configuration into which landing pod 50 fits.

A negative air pressure is applied through orifces 15, the source of such negative air pressure being the shuttle engines, the conduit being hoses 58 as distributed by plenum 56 as disposed to the underside of first and second assembly elements 36, 36'.

As the mount elements are maneuvered, under the direction of a flight-master in the carrier, negative air pressure is applied to bond landing pod 50 to mount element 14, 14'. As the rotary wing aircraft pilot feathers the rotors, the pilot reducing power, the elevational means 26, 28, 32 are actuated to selectively lower the aircraft into proximity with cantilever fuseledge 16.

As the mount element is positioned, being further aligned with stationary mount element 14, either on the lead or aft shuttle, a means for displacing the aircraft, such as hydraulically actuated displacement member 42, moves the aircraft from an elevational mount element to a stationary mount element (14'), directly over one of the two shuttles.

Displacement member 42 has engagement plug 44 rigidly affixed to a connecting, telescoping element 46 such that as displacement member is pivoted from a lateral position, as illustrated in FIG. 1, on the aft wing assembly, to a use position, the engagement plug 44 biases or urges against landing pod 50.

A plurality of roller means embedded in mount element(s) 14, 14' allow landing pod 50 to be displaced, to be laterally displaced along a longitudinal axis of the mount elements, even while being adhered to the mount elements by the application of a negative air pressure on landing pod 50.

A positive, positional control of the aircraft is achieved by utilizing both the elevational and stationary displacement members, (42/42'). Displacement members 42/42' are arrayed in opposing pairs, facing each other across the span of their respective mount elements.

One of the displacement members, 42 or 42', depending on the location of the aircraft in mount element 14 or 14', engages the landing pod end (50'), exerting force thereon for movement of the landing pod across the roller means 15', and the other, opposingly arrayed displacement member is used to urge or biase against the other end (50'') of the landing pod; the landing pod being compressed then between the pair of displacement members for a control of the landing pod(s) as the carrier is in a nose up (climbing) or nose-down, (descending) attitude of flight.

Access hatches in the aircraft (not shown) and in the wing assemblies and in the shuttles (not shown) allow aircraft crews to move from the aircraft to the catwalk (54) or downward into the shuttles.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents which may be resorted to fall within the scope of the invention.

What is claimed is:

1. A modular aircraft, comprising, a first and a second shuttle craft, said first and said second shuttle craft having a cantilever fuseledge extending therebetween, said cantilever fuseledge being pivotably attached to said first and to said second shuttle craft, said cantilever fuseledge having elevating means disposed thereon, said elevational means having means for securing a said securing means having disposed therewith at least one means for stabilizing said secondary aircraft, whereby said secondary aircraft is secured to said modular aircraft, said secondary aircraft being retrieved in flight.

2. A modular aircraft as recited in claim 1 wherein each one of said first and said second shuttle craft has a fuseledge housing depending therefrom, said fuseledge housing having means for receiving said cantilever fuseledge, whereby said cantilever fuseledge mechanically isolates said first and said second shuttle craft from random rotational adjustments of said secondary aircraft as said secondary aircraft is secured to said elevating means.

3. A modular aircraft as recited in claim 2 wherein said fuseledge housing has means for controlling a rate of rotation of said cantilever fuseledge, whereby as said cantilever fuseledge is rotated, said fuseledge housing structurally isolates said first and said second shuttle craft from said rotational movements of said cantilever fuseledge.

4. A modular aircraft as recited in claim 1 wherein said elevating means includes at least one wing assembly, each of said wing assemblies having means for control affixed thereto whereby as said elevating means is actuated, said wing assembly stabilizes said secondary aircraft.

5. A modular aircraft as recited in claim 1 wherein said elevating means includes a plurality of hydraulic actuating means, whereby as said elevating means are actuated, said securing means are elevated above said cantilever fuseledge.

6. A modular aircraft as recited in claim 1 wherein said elevating means includes a plurality of displacement means, said securing means includes a plurality of elevating mount assemblies, and a plurality of stationary mount assemblies, each one of said stationary mount assemblies and each one of said elevating mount assemblies being opposingly arrayed on said elevating means, said displacement means being opposingly arrayed on said securing means, said displacement means being in opposing arrangement whereby a retrieved aircraft secured to one of said elevating mount assemblies is positionally displaced to one of said stationary mount assemblies.

* * * * *